United States Patent
Stalsberg et al.

(10) Patent No.: US 6,687,572 B2
(45) Date of Patent: Feb. 3, 2004

(54) SUPERVISORY METHOD AND SYSTEM FOR IMPROVED CONTROL MODEL UPDATES APPLIED TO DYNAMIC BALANCING

(75) Inventors: Kevin J. Stalsberg, White Bear Lake, MN (US); Dennice F. Gayme, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 100 days.

(21) Appl. No.: 10/011,218

(22) Filed: Nov. 15, 2001

(65) Prior Publication Data

US 2003/0205086 A1 Nov. 6, 2003

(51) Int. Cl.[7] .................. G05B 17/02; G05B 23/00; G05B 15/02; G05B 13/04; G01M 1/38
(52) U.S. Cl. .................. 700/279; 73/65.07; 73/462
(58) Field of Search .................. 700/279; 73/65.07, 73/460, 462

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | |
| 4,991,247 A | 2/1991 | Castwall et al. | 8/158 |

(List continued on next page.)

FOREIGN PATENT DOCUMENTS

EP 1 036 875 A2 9/2000 .......... D06F/39/08

*Primary Examiner*—Thomas P. Noland
(74) *Attorney, Agent, or Firm*—Kris T. Fredrick; Kermit D. Lopez; Luis M. Ortiz

(57) ABSTRACT

A method for dynamically balancing a rotating system through strategic control model updates, wherein said system contains sensors and sensor measurements whose responses to control actions are used to represent the system through a control model, where said control model and sensor measurements are used to determine future control actions is disclosed. The performance of the control model is evaluated using sensor measurements and responses; the evaluation is further used to determine if it is necessary to update the control model. The ongoing performance of the current control model is anticipated utilizing rate-of-change metrics obtained by evaluating said sensor measurements and responses. When a new control model is needed, further evaluation is done to determine if sensor measurements and responses are adequate for updating the control model. When control model performance is poor and past control actions not adequate to update the control model or when system-operating conditions have changed substantially and control performance is questionable, select control actions are computed. These control actions excite the rotating system to provide sufficiently different sensor measurement response adequate to update the control model. In both cases, the select control action minimizes the negative effects on the balance system. The performance evaluations and select control actions are incorporated into a balance control procedure, thereby improving balance times and facilitating achievement of maximum spin speeds in a self-balancing system.

16 Claims, 10 Drawing Sheets

U.S. PATENT DOCUMENTS

| | | | | |
|---|---|---|---|---|
| 5,150,314 | A | 9/1992 | Garratt et al. | |
| 5,280,660 | A | 1/1994 | Pellerin et al. | 8/158 |
| 5,325,677 | A | 7/1994 | Payne et al. | 68/12.04 |
| 5,376,063 | A | 12/1994 | Greenstein | 494/37 |
| 5,490,436 | A | 2/1996 | Coyne et al. | 74/573 F |
| 5,561,993 | A | 10/1996 | Elgersma et al. | 68/23.2 |
| 5,582,040 | A | 12/1996 | Khan | 68/23.2 |
| 5,692,313 | A | 12/1997 | Ikeda et al. | 34/58 |
| 5,715,731 | A | 2/1998 | Koch | 74/573 F |
| 5,729,025 | A | 3/1998 | Erickson et al. | 250/574 |
| 5,731,868 | A | 3/1998 | Okey et al. | 356/73 |
| 5,757,481 | A | 5/1998 | O'Brien et al. | 356/243 |
| 5,761,932 | A | 6/1998 | Kim | 68/23.2 |
| 5,761,933 | A | 6/1998 | Kim et al. | 68/23.2 |
| 5,765,402 | A | 6/1998 | Ikeda et al. | 68/12.06 |
| 5,800,628 | A | 9/1998 | Erickson et al. | 134/18 |
| 5,850,748 | A | 12/1998 | Kim et al. | 68/23.2 |
| 5,862,553 | A | 1/1999 | Haberl et al. | 8/159 |
| 5,870,907 | A | 2/1999 | Cho | 68/23.1 |
| 5,893,280 | A | 4/1999 | Honda et al. | 68/12.06 |
| 5,913,951 | A | 6/1999 | Herr et al. | 8/158 |
| 5,921,148 | A | 7/1999 | Howell | 74/573 R |
| 5,923,433 | A | 7/1999 | Giuffre et al. | 356/440 |
| 5,957,144 | A | 9/1999 | Neff et al. | 134/56 D |
| 5,960,804 | A | 10/1999 | Cooper et al. | 134/56 D |
| 5,979,236 | A | 11/1999 | Hong et al. | 73/458 |
| 6,007,640 | A | 12/1999 | Neff et al. | 134/18 |
| 6,029,300 | A | 2/2000 | Kawaguchi et al. | 8/159 |
| 6,047,428 | A | 4/2000 | Min | 8/159 |
| 6,077,423 | A | 6/2000 | Roy et al. | 210/121 |
| 6,082,151 | A | 7/2000 | Wierzba et al. | 68/23.2 |
| 6,129,768 | A | 10/2000 | Johnson et al. | 8/159 |
| 6,130,928 | A | 10/2000 | Jamzadeh et al. | 377/23 |
| 6,144,447 | A | 11/2000 | Ohman et al. | 356/246 |
| 6,148,647 | A | 11/2000 | Kabeya et al. | 68/140 |
| 6,159,384 | A | 12/2000 | Roberts et al. | 210/741 |
| 6,415,206 | B1 * | 7/2002 | Ventres | 700/279 X |
| 6,438,461 | B1 * | 8/2002 | Desailly et al. | 700/280 |
| 6,507,799 | B2 * | 1/2003 | Steffen | 702/96 |
| 6,532,422 | B1 * | 3/2003 | Elgersma et al. | 702/41 |
| 6,546,354 | B1 * | 4/2003 | Gayme | 702/147 |
| 2003/0046776 | A1 * | 3/2003 | Fisi et al. | 8/158 |
| 2003/0065468 | A1 * | 4/2003 | Determan | 702/105 |
| 2003/0088377 | A1 * | 5/2003 | Stalsberg | 702/104 |
| 2003/0101018 | A1 * | 5/2003 | Stalsberg et al. | 702/173 |
| 2003/0101519 | A1 * | 6/2003 | Gayme et al. | 8/159 |
| 2003/0101812 | A1 * | 6/2003 | Stalsberg | 73/460 |
| 2003/0101846 | A1 * | 6/2003 | Stalsberg | 74/573 R |

\* cited by examiner

SUPERVISORY METHOD AND SYSTEM FOR IMPROVED CONTROL MODEL UPDATES APPLIED TO DYNAMIC BALANCING

RELATED APPLICATIONS

"This application is related to co-pending and co-owned patent applications entitled: 'Method and Apparatus for Reducing Microprocessor Speed Requirements in Data Acquisition Application,' U.S. Ser. No. 09/792,996, filed on Feb. 26, 2001 and now U.S. Pat. No. 6,507,799; 'Method and System for Detecting Fluid Injection from Stationary to Rotating Members,' U.S. Ser. No. 09/951,790, filed on Sep. 10, 2001; 'Simultaneous Injection Method and System for a Self-Balancing Rotatable Apparatus,' U.S. Ser. No. 09/896,763, filed on Jun. 29, 200 and now U.S. Pat. No. 6,532,422, 'Energy-Based Thresholds Applied to Dynamic Balancing,' U.S. Ser. No. 09/951,798, filed on Sep. 10, 2001; 'Dynamic Correlation Extension for a Self-Balancing Rotatable Apparatus' U.S. Ser. No. 09/951,932, filed on Sep. 10, 2001; 'Continuous Flow Method and System for Placement of Balancing Fluid on a Rotating Device Requiring Dynamic Balancing', U.S. Ser. No. 10/001,006, filed on Nov. 15, 2001; 'Dynamic Balancing Application Mass Placement', U.S. Ser. No. 10/001,090, filed on Nov. 15, 2001; 'Fixed-Bandwidth Correlation Window Method and System for a Self-Balancing Rotatable Apparatus,' U.S. Ser. No. 09/999,594, filed on Nov. 15, 2001; 'Data Manipulation Method and System for a Self-Balancing Rotatable Apparatus,' U.S. Ser. No. 10/000,882, filed on Nov. 15, 2001; 'Resonance Identification Extension for a Self-Balancing Rotatable Apparatus,' U.S. Ser. No. 10/001,098, filed on Nov. 15, 2001 and now U.S. Pat. No. 6,546,354, 'Method and System for Mechanizing Simultaneous Multi-Actuator Actions Applied to Dynamic Balancing,' U.S. Ser. No. 10/000,255, filed on Nov. 15, 2001."

TECHNICAL FIELD

The present invention relates generally to rotatable members that are able to achieve balanced conditions throughout a range of rotational speeds. The present invention also relates to methods and systems for dynamically balancing rotatable members through the continual determination of out of balance forces and motion to thereby take corresponding counter balancing action. The present invention additionally relates to methods and system for improving control model updates applied to dynamic balancing.

BACKGROUND OF THE INVENTION

Mass unbalance in rotating machinery leads to machine vibrations that are synchronous with the rotational speed. These vibrations can lead to excessive wear and to unacceptable levels of noise. Typical imbalances in large, rotating machines are on the order of one inch-pound.

It is a common practice to balance a rotatable body by adjusting a distribution of moveable, inertial masses attached to the body. This state of balance may remain until there is a disturbance to the system. A tire, for instance, can be balanced once by applying weights to it. This balanced condition will remain until the tire hits a very big bump or the weights are removed. However, certain types of bodies that have been balanced in this manner will generally remain in balance only for a limited range of rotational velocities. A centrifuge for fluid extraction, however, can change the amount of balance as more fluid is extracted.

Many machines are also configured as freestanding spring mass systems in which different components thereof pass through resonance ranges, during which the machine may become out of balance. Additionally, such machines may include a rotating body loosely coupled to the end of a flexible shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance. This often poses problems in the operation of large turbines and turbo generators.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining "out-of-balance" will progressively apply greater force as the speed increases. This increase in force is due to the fact that F is proportional to $r\omega^2$ (note that F is the out of balance force, r is the radius of the rotating body and $\omega$ is its rotational speed).

The mass unbalance distributed along the length of a rotating body gives rise to a rotating force vector at each of the bearings that support the body. In general, the force vectors at respective bearings are not in phase. At each bearing, the rotating force vector may be opposed by a rotating reaction force, which can be transmitted to the bearing supports as noise and vibration. The purpose of active, dynamic balancing is to shift an inertial mass to the appropriate radial eccentricity and angular position for canceling the net unbalance. At the appropriate radial and angular distribution, the inertial mass can generate a rotating centrifugal force vector equal in magnitude and phase to the reaction force referred to above.

Many different types of balancing schemes are known to those skilled in the art. When rotatable objects are not in perfect balance, nonsymmetrical mass distribution creates out-of-balance forces because of the centrifugal forces that result from rotation of the object. Although rotatable objects find use in many different applications, one particular application is a rotating drum of a washing machine.

U.S. Pat. No. 5,561,993, which was issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines not rigidly attached to immovable objects, such as concrete floors. The algorithm disclosed by Elgersma et al. permitted counterbalance forces to be calculated even when a washing machine is located on a flexible or mobile floor structure combined with carpet and padding between the washing machine and a rigid support structure.

U.S. Pat. No. 5,561,993 thus described a dynamic balance control algorithm for balancing a centrifuge for fluid extraction. To accomplish such balance control, sensor responses to balancing control actions on a centrifuge may be modeled and utilized to determine control actions to drive an associated system toward a balanced state. Such a system is generally time variant, such that the control models utilized therein can be routinely updated based on the measured response to a previous control action, which is a variation of perturbation theory, well known in the art. The control algorithm explained in U.S. Pat. No. 5,561,993 simply updated the control models after every designated control action. The present inventors realize, however, that such a control method can lead to unneeded model updates or the creation of poor models resulting in inadequate predictions. This in turn can lead to lengthy balancing times and the inability to obtain maximum spin speeds in centrifuge environments, such as, for example, a clothes washing machine.

The present inventors have thus concluded that previous methods for dynamically balancing a rotatable member have experienced severe limitations in the degree of balance that can be achieved and in the rotational speeds under which they operate. The present inventors conclude that it would be desirable to recognize when existing control models for balancing loads are no longer performing well. The present inventors also believe that it would be desirable to recognize when the results of a previous control action are adequate to support a control model update, and thereby provide a basis for updating the control model in a timely fashion to ensure that the control model sufficiently represents the system requiring balancing. The present inventors have additionally concluded that it would be desirable to implement methods and systems for computing new test actions that are based on information obtained from the system rather than applying random perturbations to the system at each new speed or when it is confirmed that the control action is not having the desired affect. The invention disclosed herein thus addresses these needs.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is still another aspect of the present invention to provide methods and systems for improving control model updates applied to dynamic balancing.

In accordance with various aspects of the present invention, methods and systems are disclosed herein for dynamically updating a control model for controlling a balance state of a rotating device or rotating system. Sensor responses can be utilized to define a control model that, along with sensor measurements, can be used to determine control actions that drive the rotatable apparatus to a balanced state and provide new sensor responses. Recognizing when an existing control model is no longer performing well, and when the results of a previous control action are adequate to support a control model update, a basis is provided for updating the control model in a timely fashion and ensuring that it sufficiently represents the rotatable apparatus. A global or aggregate metric, along with a sensor distribution metric, may be calculated from sensor measurements and evaluated to determine if it is necessary to update the control model and to determine if the recent sensor response is sufficient to update the control model. The performance of the control model may be evaluated utilizing rate of change data obtained by evaluating sensor measurements from one control action to the next. When prior control actions are not adequate for control model update, or the system experiences a significant operational change, forced control actions (test actions) may be computed with the intent of moving along the anticipated best balance-control trajectory and doing this with two sufficiently different control actions so as to provide sufficient system response for a control model update. The collection of these methods and systems ensure timely control model updates for an accurate control model under changing system conditions, thereby improving balance times and enhancing the achievement of maximum spin speeds in a rotating system. Similar techniques may be utilized to determine whether or not a balanced state (i.e., threshold) has been met or exceeded.

The present invention thus makes possible an improved dynamic balancing procedure that accounts for both forces and motion that may be imposed on a rotating member or rotating apparatus, such as the drum of a washing machine.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

The present invention is generally an improvement to the invention disclosed in U.S. Pat. No. 5,561,993. The basic configuration and concepts explained in U.S. Pat. No. 5,561,993 are disclosed herein but in no way limit the scope of the invention described and claimed herein. Features revealed in U.S. Pat. No. 5,561,993 are presented herein for illustrative purposes only in order to explain the foundation from which the present invention has been derived. Those skilled in the art can appreciate that such features, including figure, text, descriptions, equations and tables thereof, do not limit the scope of the present invention.

Figure 1:
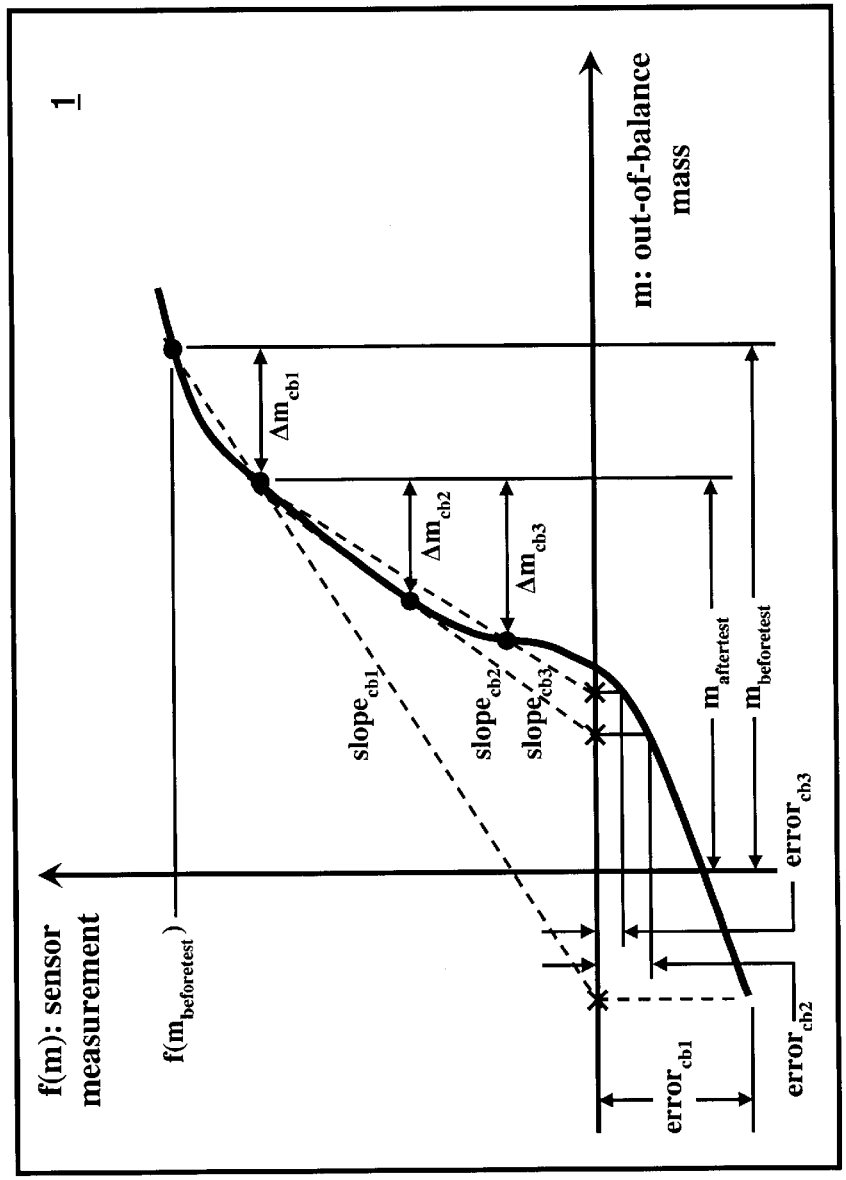
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as the non-linear system in FIG. 1, the system can be balanced when the sensor measurement, f(m), is driven to zero. The objective of such a system is to find a value for a counterbalance $\Delta m$, such that the sensor measurement f(m) is driven to zero, i.e., f(m)=0. Utilizing a Taylor's series expansion in the vicinity of the anticipated operating range and neglecting second order and higher terms, results in a linear model of the form y=b+mx. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that $f(m_{next})$ represents the desired sensor measurement. In addition, $f(m_{aftertest})$ can represent the sensor measurement after a test action or a prior balance-control action. The variable m generally represents the out of balance in the system. For example, the variable $m_{aftertest}$ generally represents the out-of-balance after a test action ($\Delta m_{test}$), and the change in m, (i.e. $\Delta m = m_{next} - m_{aftertest}$), is the counterbalance required to achieve a desired sensor measurement, ($f(m_{next})$=0). The control action involves moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find $f(m_{next})$=0, the general form of the equation reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out of balance needed to make $f(m_{next})$=0 or to drive the sensor measurement to zero. Thus, the estimated mass change $\Delta m_{cb}$ generally required for counterbalance action is illustrated in equation 3.

$$\Delta m_{cb} = m_{next} - m_{aftertest} = -f(m_{aftertest}) \Big/ \left(\frac{\partial f}{\partial m}(m_{aftertest})\right) \quad (3)$$

The partial derivative, or slope of the sensor function, can be found by perturbing the system. This may be generally illustrated in equation 4, which represents the change in sensor measurements due to a test action ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 may result in the generalized form shown in equation 5, which equation is generally expressed as an expanded notion of multiple inputs and outputs.

$$[f(m_{aftertest})] = -\left[\frac{\partial f(m)}{\partial m}\right] \cdot [\Delta m_{solution}] \quad (5)$$

Regarding the linear models and associated slope calculation in FIG. 1, it can be appreciated that a change in the mass may result in a change in the system, and the system itself may be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution and the measurement's f(m) being smooth, nearly linear and single-valued in the vicinity of the anticipated operation. Additionally, because higher derivatives are neglected in this type of approximation, the higher derivatives should be small, so as to avoid convergence problems.

Lastly, in applications of the Newton Raphson iteration, only one solution of mass $\Delta m_{cb}$ should exist for the sensor measurement being equal to zero. This means there is only one root. Even after following the above requirements, system noise may be a concern. In the hypothetical illustration of FIG. 2, a larger initial test action, which changes the system to point C, is preferable to the one that changes it to point B. Comparing the slopes of lines 22, 24 and 26, which result from the various test mass perturbations depicted in FIG. 2, can evidence system noise issues. The difference between the before and after test measurement should be large enough to obtain a good approximation of the slope of the function and ensure the resulting change in the measurement dominates the changes due to system noise.

Figure 3:
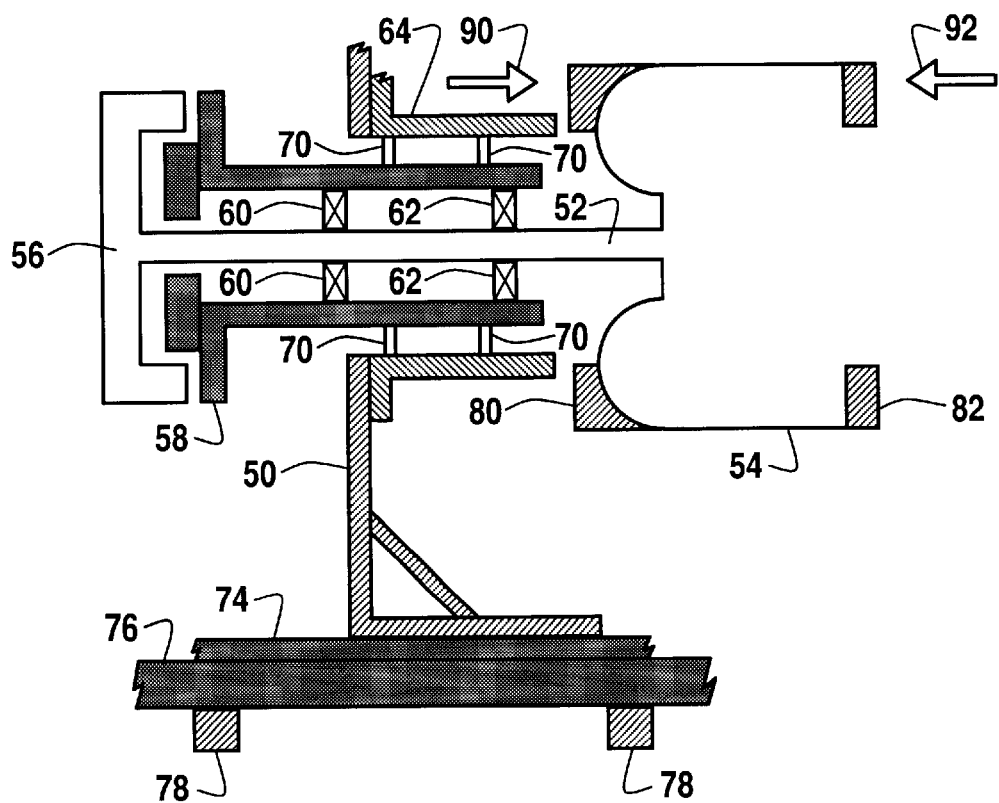
FIG. 3 depicts a schematic representation of a washing machine, which may be adapted for use in association with the present invention.

FIG. 3 depicts a schematic representation of a washing machine, which may be adapted for use in association with the present invention.

Those skilled in the art can appreciate that the present invention may be implemented within a rotating device or rotating system, such as, for example, a washing machine. Those skilled in the art can further appreciate, however, that other types of rotatable systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. The methods and systems of the present invention may be implemented to balance rotating systems, rotating devices or rotating members thereof. Such rotating systems or rotating devices may be configured as, for example, washing appliances. Examples of such washing appliances may include washing machines, dishwashers, circuit board cleaners, and so forth.

In the example of FIG. 3 the basic mechanism of dynamic balancing involves counter balancing the out-of-balance load by injecting water into a plurality of cups placed at front and back axial planes, identified by reference numbers 80 and 82 in FIG. 3, of the rotatable drum. Although the terms "test mass" or "mass" may be utilized interchangeably in the context of one or more embodiments of the present invention to refer to a "fluid mass," those skilled in the art can appreciate that such a test mass or mass may be comprised of many different materials, and the invention is not limited to fluid-based injection for placing mass.

FIG. 3 thus schematically illustrates a washing machine comprising a frame 50, a shaft 52 and a rotatable drum 54. Shaft 52 may be attached to rotatable drum 54. These two components can be attached to a rotor or pulley 56 of a motor drive. Frame 50 can provide support for a bearing housing 58 in which bearings, 60 and 62, are generally supported. A housing mount 64 can support bearing housing 58. A plurality of sensors identified by the reference numeral 70 is illustrated at locations between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal washing machine in a residential housing environment. Those skilled in the art can appreciate that FIG. 3 is presented for illustrative purposes only and that a variety of washing machine configurations and other rotating devices not illustrated herein may be utilized to implement varying embodiments of the present invention.

With continued reference to FIG. 3, the rotatable drum 54 may be shown having a plurality of schematically illustrated back cups.80 and front cups 82. Both the front and back cups may be disposed at axial ends of the rotatable drum 54 and, although not shown in FIG. 3, both the front and back cups can comprise a plurality of cups dispersed around the periphery of the drum. A quantity of water can be injected into the cups from a stationary control valve supplied with water, such as those identified by reference numerals 90 and 92.

Figure 4:
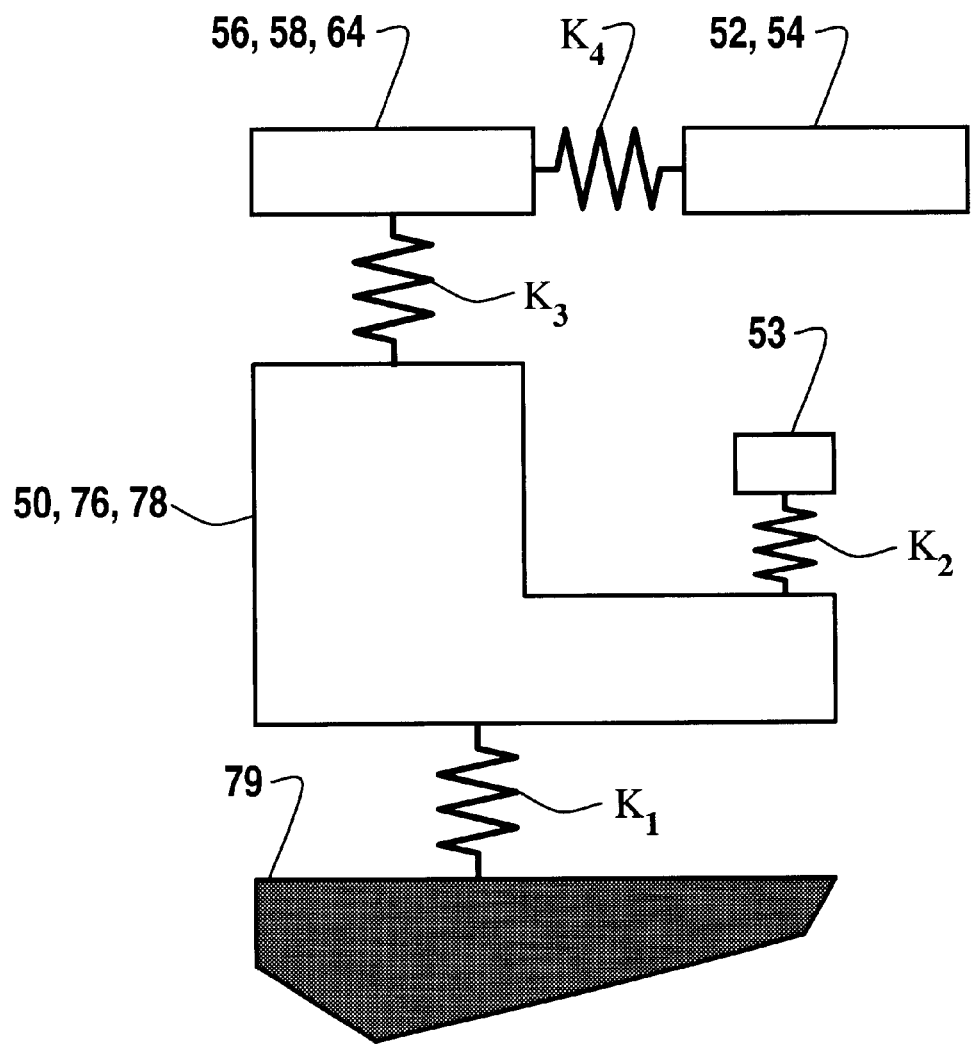
FIG. 4 illustrates a spring and mass illustration depicting the manner in which a nonrigid washing machine can behave if mounted on nonrigid structures.

Some balancing systems assume that the machine may be attached rigidly to an immovable object or footing, such as a concrete floor. In most practical residential housing applications, however, the machine is not rigidly attached to an immovable object and, instead, may be associated with a plurality of flexible members. For example, FIG. 4, depicts a schematic representation of a type of arrangement usually encountered in washing machine applications. FIG. 4 thus illustrates a spring and mass diagram depicting the manner in which a nonrigid washing machine can behave if mounted on nonrigid structures.

The behavior of frame 50 in relation to footing 79 can be.described as a spring representing frame 50 and floor 76 and having a spring constant K1. The relationship between a tub 53 surrounding the rotatable drum 54 and frame 50 can be described by a spring constant K2. A spring constant K3 represents the relationship between bearing housing 58 and housing mount 64, and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems that define the relationships among major components of the overall system. One purpose for illustrating FIG. 4 is to demonstrate that the relationships among these components are not rigid and, as a result, can permit motion, resulting in accelerations, to occur in response to forces exerted on the various components. Therefore, if the system is not rigid and only forces are measured by the sensors 70 shown in FIG. 3, accurate counterbalance determinations would be extremely difficult, if not impossible, to make.

Figure 2:
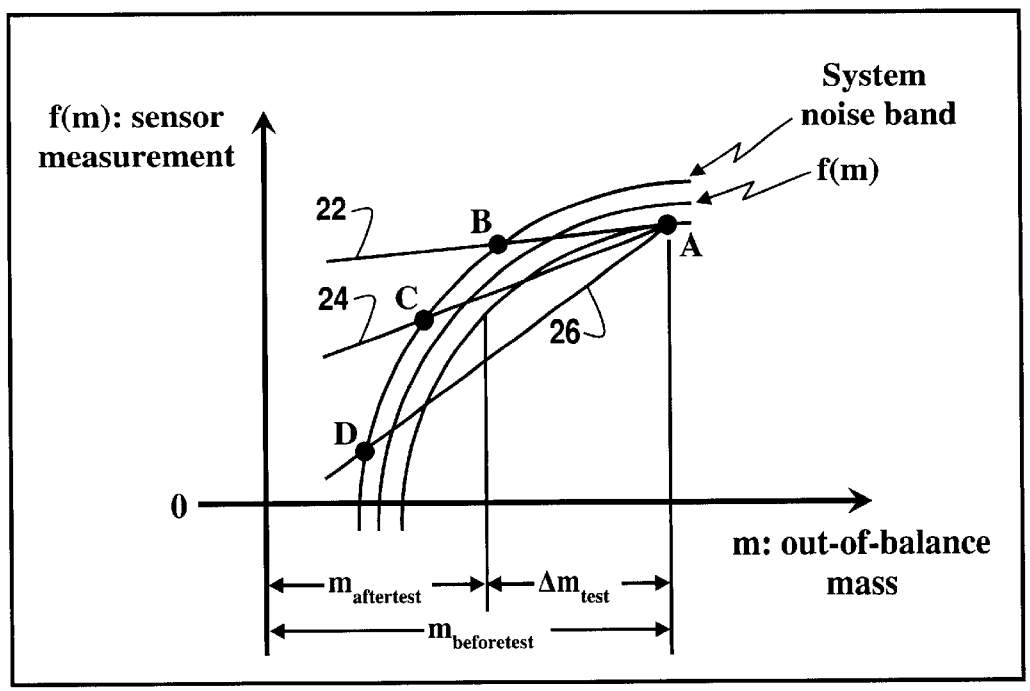
FIG. 2 illustrates a graphical representation of a nonlinear system and the effect of system noise with which the present invention is concerned.
Figure 5:
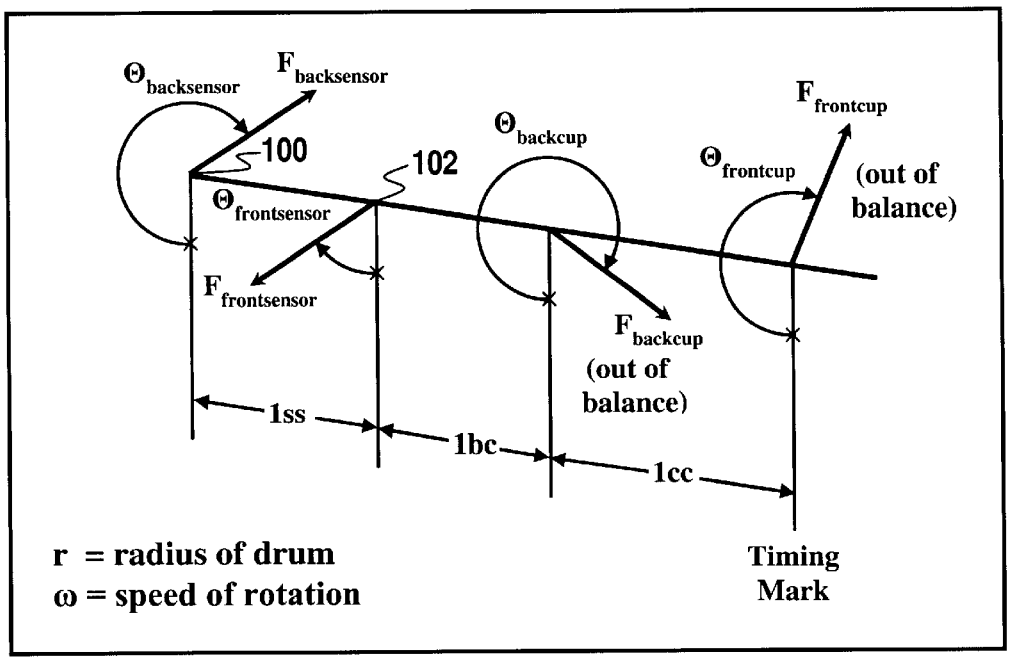
FIG. 5 depicts a three-dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system, can be determined at each of the first and second locations, 100 and 102, of the axis of rotation.

If a washing machine or similar apparatus with a rotating member is rigidly attached to an unmovable object, such as a concrete floor, in such a way that movement of the machine is prevented, a mere force and moment analysis based on forces and moment arms shown in FIG. 5 would be appropriate and, thus, yield sufficient information to allow counterbalance forces to be implemented in a manner that would achieve a balance of a rotating drum 54. As discussed above in association with FIGS. 3 and 4, however, it is not practical to expect a machine of this type to be installed and operate without motion being experienced by the various portions of the machine. Therefore, it may be beneficial to measure motion relative to a footing or inertial space (e.g., acceleration) and account for it in the analysis of forces.

Figure 6:
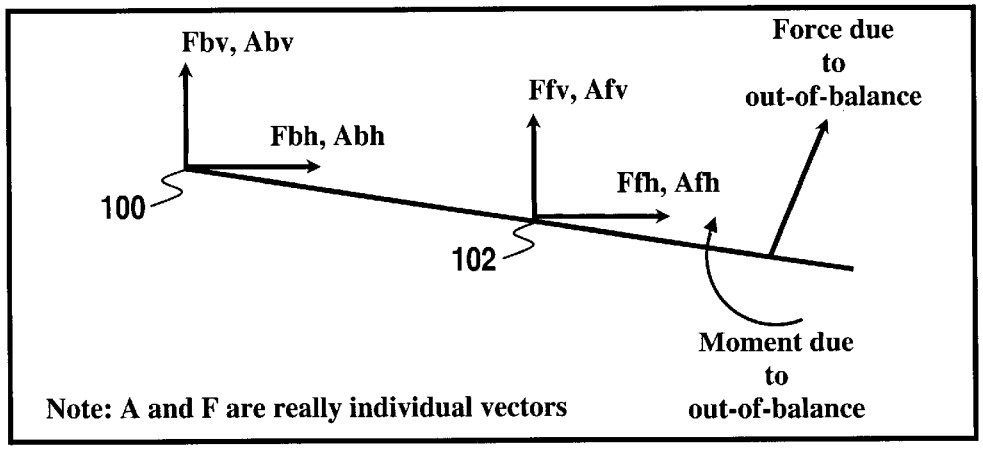
FIGS. 6 and 7 depict a graphical representation of a shaft with measured forces and accelerations.
Figure 7:
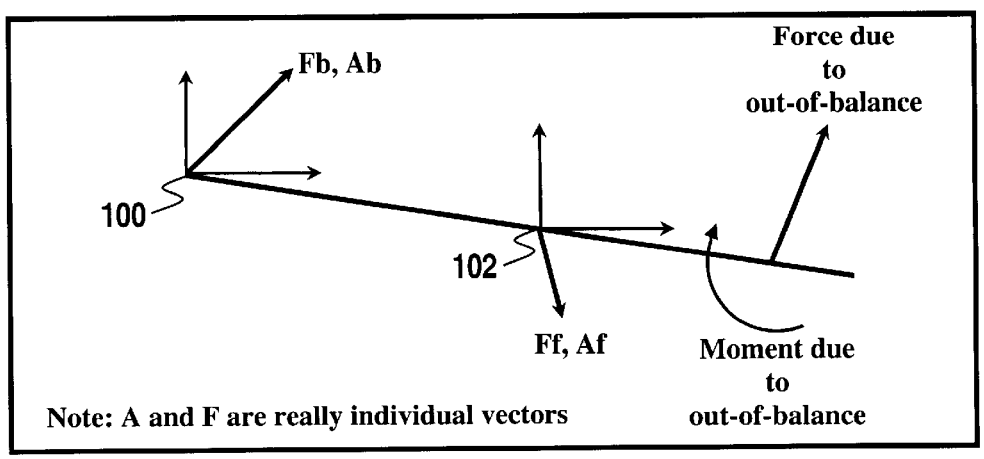

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. It can be appreciated by those skilled in the art that the coordinates illustrated in FIGS. 6 and 7 represent the fact that the concepts in U.S. Pat. No. 5,561,993 and the present invention operate with information describing the forces in terms of a magnitude, a fixed direction and an associated rotating drum angle. Similarly, the motion (e.g., accelerations) may also be expressed as a magnitude along a fixed direction with an associated rotating drum angle.

TABLE 1

| VARIABLE | MEANING |
|---|---|
| Inputs | |
| $\Delta m_{front\_cb}$ | test counterbalance mass placed in the front plane (vector) |
| $\Delta m_{back\_cm}$ | test counterbalance mass placed in the back plane (vector) |

TABLE 1-continued

| VARIABLE | MEANING |
|---|---|
| $\omega_{back}$ | speed of rotation in (rad/sec) at which the back plane test counterbalance occurred |
| $\omega_{front}$ | speed of rotation in (rad/sec) at which the front plane test counterbalance occurred |
| R | radius of counterbalance placement (inches) |
| $\omega$ | current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $m_{frontplane\_cb}$ | estimated frontplane counterbalance to drive sensor readings to zero (vector) |

For the following discussion, Table I illustrates the inputs and outputs utilized in the multi-input/multi-output condition relating to the invention described in U.S. Pat. No. 5,561,993. In order to find the appropriate solutions for the counterbalance forces described above, measured forces and accelerations should be considered in the balancing of system forces and moments. As described above, the counterbalance masses, forces and accelerations represent magnitudes and angles. Therefore, all variables shown in Table I, except r and $\omega$, generally comprise both a magnitude and an angle in polar coordinates, which can be converted to complex coordinates. The relationship described in equation 5 above can be rewritten for the multi-input/multi-output case to result in four coupled simultaneous equations, incorporating the effects of perturbations in both front and back planes that could have occurred at rotational speeds slightly different from the current speed. These four relationships are shown below and are identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

The four mathematical relationships illustrated in equation 6 above can be grouped together as a single equation because they are treated as a matrix in the following discussion. The meanings of the subscripts in equation 6 above are identified in Table II.

TABLE II

| SUBSCRIPT | MEANING |
|---|---|
| 0 | Measurement prior to backplane counter-balance test mass $\Delta m_{back\_cb}$ |
| 1 | measurement after backplane counter_balance test mass $\Delta m_{back\_cb}$ |
| 2 | measurement prior to frontplane counterbalance test mass $\Delta m_{front\_cb}$ |
| 3 | measurement after frontplane counterbalance test mass $\Delta m_{front\_cb}$ |
| 4 | current sensor measurement |

The relationships shown above in equation 6 can be applied to equation 5 in matrix form as:

$$\begin{bmatrix} a_{back\,4} \\ a_{front\,4} \\ f_{back\,4} \\ f_{front\,4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{backplane\_cb} \end{bmatrix} \cdot r \cdot \omega^2 \quad (7)$$

where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \quad (8)$$

Equations 6, 7 and 8 depict the mathematical model generally described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously to formulate the control model and apply control actions. This more general control model solution is briefly discussed and used herein for describing the present invention.

For the more general control model solution, the model developed in equations 5, 6, and 7, take on the general form shown in equation 9.

$$f(i+2) = \qquad (9)$$

$$\left[ \begin{array}{cc} \dfrac{f(i+1)-f(i)}{\|m(i+1)-m(i)\|} & \dfrac{f(i+2)-f(i+1)}{\|m(i+2)-m(i+1)\|} \end{array} \right] \left[ \begin{array}{cc} \dfrac{m(i+1)-m(i)}{\|m(i+1)-m(i)\|} & \dfrac{m(i+2)-m(i+1)}{\|m(i+2)-m(i+1)\|} \end{array} \right]^{-1} \left[ \begin{array}{c} \Delta m_{back} \\ \Delta m_{front} \end{array} \right]$$

In equation 9 above, f(i) represents the $i^{th}$ sensor reading; f(i+2) is equivalent to f($m_{aftertest}$) illustrated in equation 5. Also, m(i) may be a complex vector representing the force at the front and back planes of the rotating apparatus resulting from the $i^{th}$ test action. The equation $\Delta m(i+1) = m(i+1) - m(i)$ may represent a complex vector of counter balance force or test actions applied to the spinner; each test action is formed by injecting simultaneously in the front and the back plane of the spinner. The A matrix (df(m)/dm) obtained from equation 5 is now represented by the relation shown in equation 10.

$$A = -\dfrac{\partial f}{\partial m(i)} = -\left[ \begin{array}{cc} \dfrac{f(i+1)-f(i)}{\|m(i+1)-m(i)\|} & \dfrac{f(i+2)-f(i+1)}{\|m(i+2)-m(i+1)\|} \end{array} \right] \left[ \begin{array}{cc} \dfrac{m(i+1)-m(i)}{\|m(i+1)-m(i)\|} & \dfrac{m(i+2)-m(i+1)}{\|m(i+2)-m(i+1)\|} \end{array} \right]^{-1} \qquad (10)$$

Equation 11 below shows the A matrix for the more general control model solution, where 2 control actuators, or control planes, and 4 sensor readings are available as in the case of equations 6 through 8.

$$A = -\left[ \begin{array}{cc} \dfrac{a_{back1}-a_{back0}}{\|\Delta m(1)_{cb}\|} & \dfrac{a_{back2}-a_{back1}}{\|\Delta m(2)_{cb}\|} \\ \dfrac{a_{front1}-a_{front0}}{\|\Delta m(1)_{cb}\|} & \dfrac{a_{front2}-a_{front1}}{\|\Delta m(2)_{cb}\|} \\ \dfrac{f_{back1}-f_{back0}}{\|\Delta m(1)_{cb}\|} & \dfrac{f_{back2}-f_{back1}}{\|\Delta m(2)_{cb}\|} \\ \dfrac{f_{front1}-f_{front0}}{\|\Delta m(1)_{cb}\|} & \dfrac{f_{front2}-f_{front1}}{\|\Delta m(2)_{cb}\|} \end{array} \right] \cdot \qquad (11)$$

$$\left[ \begin{array}{cc} \dfrac{\Delta m(1)_{back\_cb}}{\|\Delta m(1)_{cb}\|} & \dfrac{\Delta m(1)_{back\_cb}}{\|\Delta m(2)_{cb}\|} \\ \dfrac{\Delta m(1)_{front\_cb}}{\|\Delta m(1)_{cb}\|} & \dfrac{\Delta m(1)_{front\_cb}}{\|\Delta m(2)_{cb}\|} \end{array} \right]^{-1}$$

The equation relationships shown in equation 9 can be rearranged to solve for the counterbalance forces, $\Delta m_{back}$ and $\Delta m_{front}$, required to bring the system into balance. Utilizing the A matrix from equation 11 for the case of four sensors, a relationship can be expressed through equation 12 as follows:

$$\left[ \begin{array}{c} \Delta m_{back} \\ \Delta m_{front} \end{array} \right] = A^+ \cdot \left[ \begin{array}{c} a_{back} \\ a_{front} \\ f_{back} \\ f_{front} \end{array} \right] \qquad (12)$$

In a situation such as that described by equation 12 above, four sensor values (i.e., two accelerations and two forces) are generally known from measurements. Two counterbalance forces are unknown. This results in a situation where there are more equations than unknowns as each sensor provides an equation. Conversely, there are only two unknown counterbalance forces for the front and back planes of the drum. This condition describes an over-determined system and a technique generally required to solve for more equations than unknowns in an optimal manner.

A technique for solving equations of this type in a balancing scheme should find a solution that minimizes all of the sensor readings and also minimizes the amount of counterbalance media required to balance the rotating system or rotating device. In other words, the force sensors and the accelerometers should all be driven as close to zero as possible by the selected counterbalances and the total amount of counterbalance media (i.e., fluid or mass) applied be minimized.

Those skilled in the art can appreciate that a mathematical technique, which may solve this problem involves computation of the pseudo inverse of the A matrix ($A^+$) utilizing a singular value decomposition (SVD) technique. This solution method finds the optimal solution to the inconsistent system represented simply by equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993, which is incorporated by reference herein. The SVD technique is well known to those skilled in the art and is described in significant detail in various reference linear algebra textbooks.

After generating the solution to equation 12, it may be necessary to formulate a practical approach to applying the counterbalance mass to the rotating member. Further, after the control action is applied it may be necessary to evaluate the member to verify that the control action had the desired balancing affect. In an ideal system, the force applied to the rotating portion of the member is linearly related to the force and motion that the sensors measure. In this ideal system the placement of the optimal counterbalances determined by the solving the system in the manner described herein should drive all of the sensors to zero and achieve perfect balance of the rotating member.

For various reasons, however it is not expected that an ideal system exists and certain system-balance, operational safety, and physical constraints should be considered. An approach to applying counterbalance and verifying the control action effect is fully described in U.S. Pat. No. 5,561,993, which is incorporated herein by reference. Those skilled in the art can appreciate that the approaches to applying counterbalance and verifying the control action affect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

In applying counterbalance and verifying the control action, in a preferred embodiment of the present invention, "system-balance", operational safety, and physical constraints can be evaluated based on the concept of sensor measurement thresholds and metrics. In regard to the thresholds, the extremes are the balance threshold and the maximum threshold. The balance threshold defines the sensor level below which the rotating member is defined as being in a balanced state. The maximum threshold defines the sensor level above which the rotating member should not be for any extended length of time. Intermediate thresholds establish levels at which balance control versus speed control decisions get made. The system-balance and operational safety constraints may direct the top-level control sequence.

Physical limits and safety evaluation impact control actions operating points between the balance and the maximum threshold levels. The control actuator applies a physical limit on the amount of input that can be applied to the system at any one time (smallest and largest), as does the physical design of the rotating member in terms of accommodating the counterbalance mass. These physical limits are evaluated in terms of their ability to affect sensor responses by an amount less than the balance threshold with sufficient room to operate (i.e., allow multiple control actions) within the balance to maximum threshold range. Given sufficient room to operate, the size and correctness of a recommended counterbalance action may be a safety concern. A large recommended counterbalance action or an incorrectly placed counterbalance may increase rather than decrease the degree of out-of-balance; as such, it may not be prudent to apply the entire counterbalance to the member in one control action. Thus, a set of limits may be used to safely apply the recommended counterbalance action to the rotatable member. Conversely, system-balance constraints come into play when control actions, counterbalance or test are used to create or update the control model as described above; these actions should be large enough to provide a good approximation of slope, as illustrated in FIG. 1.

System-balance constraints further influence counterbalance control actions in terms of maintaining the desired control trajectory. In the configuration being used for illustration of the concepts herein, counterbalances are applied to the spinner by simultaneously injecting a predetermined mass of water across a predetermined range of rotation angles in both the front and back planes of the spinning member at the current rotational speed. The result of the injection can be resolved mathematically to determine the net counterbalance force applied to the system or to resolve the net force into its front and back plane components.

In order to apply the desired force, the water is often injected over a number of revolutions of the apparatus. This progressive nature of the counterbalance action may make it necessary to maintain the proper vector direction of the force throughout the control action in order to evaluate the system after each successive step along the counterbalance force vector and make decisions more quickly during problem periods. To maintain this direction, it may be useful to establish a ratio between the magnitudes of the front and back plane elements in the force vector on the left side of equation 12. This front-to-back ratio is defined by equation 13.

$$\text{front\_to\_back\_ratio} = \frac{\Delta m_{\text{front\_cb}}}{\Delta m_{\text{back\_cb}}} \quad (13)$$

Lastly, system-balance constraints are associated with the non-linearity and time-varying nature of the system and its imbalance across operating speeds. Meeting the necessary constraints outlined above, the response to the counterbalance actions is measured and may be used to update the control model to account for the system non-linearity and time-varying dynamics. Measurements of the forces and motions at various locations within the rotatable apparatus are made before and after each control action and may be used to update the control model described by equations 9 through 12. That updated model along with further sensor measurements may be utilized to determine a prediction of the next required correction counterbalance control action. If the prior control action cannot be used to update the control model, test actions are created. This process continues until balance condition is achieved (i.e., all sensor values below balance threshold) at full operating speed.

Systems and methods utilized to determine whether or not the control model is performing well and if prior actions can be utilized to update the control model, as well as methods for determining quality test action in the event prior control actions cannot be used directly, are the subjects of the present invention. Given a recommended counterbalance control action, the previously described constraints are applied to divide it into appropriately sized control sets, the sum of the sets defining the whole control action. After each control set, the balance control system utilizes various conditions or metrics to assess the affect that the action had on the system. As described earlier, the first condition is a comparison of the individual sensor measurement magnitude to its respective balance thresholds. Another set of related system conditions or metrics is based on a global or aggregate sensor measure of the system and the distribution of the sensor measurements. The information that is of interest is the amount that this global measure changes between incremental steps along the recommended control action as well as the running sum of the changes over the entire recommended control action. The distribution metric indicates whether one sensor measure strongly influences the global metric or that several sensor measures have contributed. Together, the global and distribution metrics are used to assess control model performance and determine if sufficient information is available to update the control model. The rate at which the system is changing is also evaluated based on the global sensor measure and is used to anticipate control model performance.

The global measure that may be used is a cost function of the form:

$$J = \left[\sum w_i |f(m_i)|^n\right]^{\frac{1}{n}} \quad (14)$$

In equation 14, m may be a complex vector representing the input forces applied to the rotating member and experienced by the system. In the preferred embodiment a force couple at the front and back of the rotating member can be used to uniquely describe these forces. As such, counterbalance force changes may be applied at the front and back planes of the rotating member. The function $f(m_i)$ represents the ith component of a complex vector of sensor measurements at the condition corresponding to each m. Additionally, $f(m_i)$ is defined as a threshold function where there is some minimum value below which the function evaluates to zero and above which the function assumes the magnitude of $f(m_i)$; the minimum values may be determined based on the sensor resolution or the amount of sensor noise in the system. The $w_i$ term may represent a weighting for the ith sensor. Such a weighting may be determined in a number of ways and may generally be used to emphasize certain sensors of interest. The variable n may be chosen to define the shape of the surfaces that the global measure defines in the sensor space, a value of 2 corresponds to ellipses and a value of infinity corresponds to squares. The shape of the surfaces defines the relationship among all the different types of sensors and their corresponding vector directions.

This cost function as described above provides a global metric of the present sensor magnitude condition. By replacing $f(m_i)$ in equation 14 with $\Delta f(m_i)$ or $\Sigma \Delta f(m_i)$, it can likewise be used to provide a global metric of the change in sensor magnitude over one increment of the control action or the change in sensor magnitude over the running sum of the incremental control actions, respectively.

The distribution metric is intended to show how the affect of the control action distributes across the sensor measurements. In this way, a better decision can be made regarding use of the global metric. Implementation of the distribution metric can be a simple threshold and tracking of the sensor measurements. The change in a sensor measurement should be at least a designated multiple of the sensor measurement error and at least two sensor measurements would have exceeded this limit in order for a global metric computation to be performed. Alternatively, standard statistical distribution methods may be used to accomplish the desired metric.

The global metric, qualified by the distribution metric, can be compared before and after a control action to determine if in general the balance condition improved. If the present magnitude of the global metric is larger than the previous value, then the system can be determined to be getting worse, indicating a bad recommended control trajectory. In the system described in U.S. Pat. No. 5,561,993 the system improvement was evaluated based on an individual sensor level and the system could be classified as getting worse when only one sensor increased in value. If this sensor was below its balance threshold and all the other sensors were improving, the supervisory control may have stopped a control action that would have eventually balanced the system. This global and distribution metric approach allows one to evaluate the entire system so that an individual sensor does not bias all of the mass placement supervisory control decisions.

Another method that can be used to evaluate the performance of the control model between control actions involves the rate at which global measure is changing. As was previously described, a control action can be too large and go beyond balancing the system to creating an "out of balance" 180 degrees across from the previous "out of balance". If operating in a region where the rotatable system response becomes particularly non-linear, as depicted in FIG. 1, a balanced condition may be rapidly approached with the first few control sets. An additional example is that while moving into and out of a resonance condition, the rate of change of the global function can vary sharply, indicating that the dynamics of the system are quickly changing and the validity of the control model is decaying. In any case, if the linear control model poorly represents the actual system performance curve, each control set will move the system further from what is expected and the rate of change in the global metric may be a leading indicator of this. An increased or decreased rate of change can be used to make a decision to stop injecting mass, before continued injection of mass creates a worse condition.

With these methods for determining control model performance and usability of the latest system response to control actions to update the control model, it is conceivable that at some point, for various reasons, the control model performance will be poor or inadequate and the previous control responses inadequate for updating the control model. In these circumstances, test actions are required; rather than applying random test actions, test actions that may benefit balance control are desirable and can be computed (i.e., smart test actions). There are several defining cases for producing test actions. The first case involves the situation in which no prior control model exists or consecutive control responses have not provided enough information to update the control model. In this first case, two predefined and sufficiently different test actions are utilized.

The second case involves the situation in which a prior control model exists, but the system has experienced a substantial change in operating conditions, (e.g., a change in rotational speed). The system in question is not an ideal linear system. Thus, when a model is created at one speed and the speed is then increased, the model may no longer be valid. Yet, it remains the "best guess" at a course for control action. Thus, at each new speed, the first or initial test actions at the new speed can be calculated based on the last model formed at the previous speed, along with the current sensor measurements. The recommended control action can be broken down into two separate and sufficiently different test actions: "smart test actions." Given a desired counterbalance vector, v, one may wish to find vectors $v_1$ and $v_2$ such that v can be broken into two sufficiently different test actions, such as shown in equation 15:

$$[\vec{v}_1 \ \vec{v}_2]\begin{bmatrix}1\\1\end{bmatrix} = [\vec{v}] \quad (15)$$

$$i.e. \ \vec{v}_1 + \vec{v}_2 = \vec{v}$$

$$\vec{v}_1 = \frac{\vec{v}}{2} + \vec{w}$$

$$\vec{v}_2 = \frac{\vec{v}}{2} - \vec{w}$$

To determine vector w and ensure sufficient difference between vectors $v_1$ and $v_2$, the desired condition is that the vectors w and v, as well as vectors $v_1$ and $v_2$, are orthogonal, as expressed in equation 16.

$$\vec{w}^T\vec{v} = 0 \text{ or } \vec{v}^*\vec{w} = 0 \text{ and} \quad (16)$$

$$\vec{v}_1^*\vec{v}_2 = 0$$

The condition on vectors $v_1$ and $v_2$ can be expanded to determine the requirement on the magnitude of w, shown in equation 17.

$$\left(\frac{\vec{v}}{2} + \vec{w}\right)^*\left(\frac{\vec{v}}{2} + \vec{w}\right) = \frac{\|\vec{v}\|^2}{4} - \|\vec{w}\|^2 = 0 \quad (17)$$

$$\|\vec{w}\| = \frac{\|\vec{v}\|}{2}$$

Performing a singular value decomposition of vector v yields an orthogonal or unitary matrix U, whose columns are orthogonal unit vectors $U_1$ and $U_2$, as shown in equation 18. Vector v is a scalar multiple of vector $U_1$, thus vector $U_2$ is orthogonal to vector v and, using the result from equation 17, can be used to construct vector w and the two desired test action vectors, $v_1$ and $v_2$, as shown in equation 18.

$$\vec{v} = \begin{bmatrix} u_{11} & u_{12} \\ u_{21} & u_{22} \end{bmatrix} \begin{bmatrix} \|\vec{v}\| \\ 0 \end{bmatrix} [x_1] = [\vec{U}_1 \ \vec{U}_2] \begin{bmatrix} \|\vec{v}\| \\ 0 \end{bmatrix} [x_1] = \|\vec{v}\| \cdot x_1 \cdot [\vec{U}_1] \quad (18)$$

Therefore $$\vec{w} = \frac{\|\vec{v}\|}{2} \vec{U}_2$$

And the test action vectors become $$\vec{v}_1 = \frac{\vec{v}}{2} + \frac{\|\vec{v}\|}{2} \vec{U}_2$$

$$\vec{v}_2 = \frac{\vec{v}}{2} - \frac{\|\vec{v}\|}{2} \vec{U}_2$$

Using these sufficiently different test actions, derived from a desired control action is an improvement over the procedure described in U.S. Pat. No. 5,561,993, where arbitrary test actions were applied at each new speed.

The third case is when a prior control model exists or a first test action has been performed, and the control model needs a partial update, i.e., only one column of the A matrix needs updating; but the system response to the prior control action was not adequate to update the control model or the response to the first test action was not sufficiently different from the desired second test action. Thus, a single test action is needed that is sufficiently different from the last control or test action used to update the control model. Again, computing an appropriate test action involves the determination of a vector $U_2$ that is sufficiently different from the last control or test action that was used to update the model, referred to as $\Delta \overline{m}_1$. There are many mathematical techniques that can be utilized to determine a vector that is sufficiently different from $\Delta \overline{m}_1$, in the preferred embodiment, and as with the prior case, the method selected involves the use of the singular value decomposition. Those skilled in the art will recognize that this choice of method does not in any way limit the invention. For the same reasons described regarding equation 18, the solution to the equation 19 provides the vector $\overline{U}_2$ that is sufficiently different from $\Delta \overline{m}_1$.

$$[\overline{U}_1 \ \overline{U}_2] \begin{bmatrix} \sigma_1 \\ 0 \end{bmatrix} \vec{x}_1^* = svd(\Delta \vec{m}_1) \quad (19)$$

where:

$$\begin{bmatrix} \sigma_1 \\ 0 \end{bmatrix}$$

resents the singular value of $\Delta \overline{m}$, $\sigma_1 = \|\Delta \overline{m}_1\|$ $\overline{x}_1$ is 1×1 \hfill (19)

and $$\frac{\Delta \vec{m}_1}{\|\Delta \vec{m}_1\|} = \vec{U}_1 \cdot \vec{x}_1^*$$

The sufficiently different test action described by vector $U_1$ is an action that is primarily meant to update the control model and has in no way been optimized to balance the system. Thus, it may be scaled to the minimum test size necessary to perturb the system.

Figure 9:
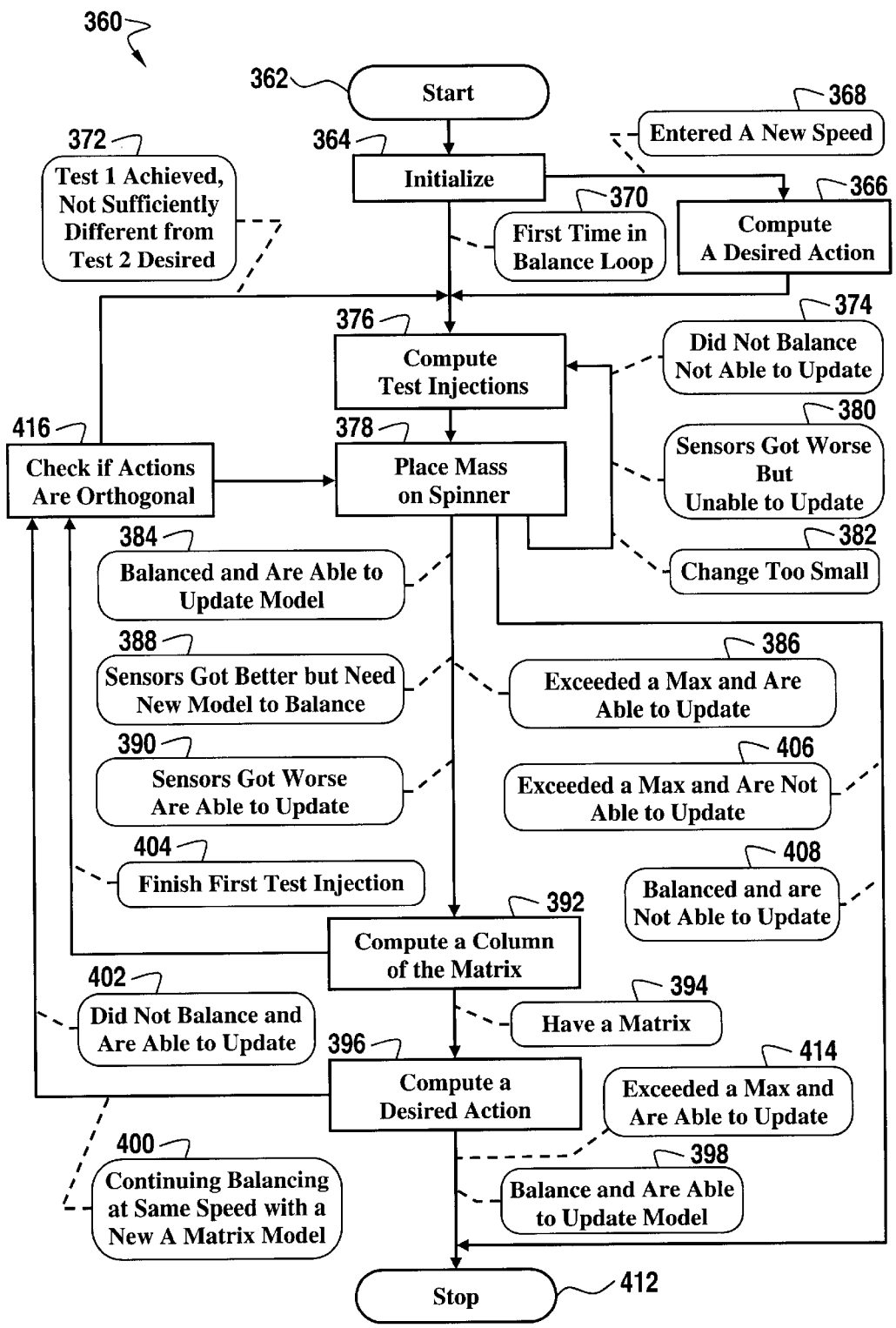
FIG. 9 illustrates a state-transition-type diagram illustrating operational steps for implementing a balance loop, in accordance with preferred embodiments of the present invention.

With the general approach and constraints to placing mass described, and the new performance metrics defined, along with methods for computing test actions, consider the supervisory method and system for improved control model updates. FIG. 9 illustrates a state transition-type diagram 360 illustrating operational steps for implementing a balance control loop that includes deliberate updates to the control model, exploiting the performance metrics and test action computations described herein. In accordance with a preferred embodiment of the present invention, the operations depicted in FIG. 9 describe a sequence of operations and conditions regarding the types of decisions that are generally made in balancing a rotating apparatus at each speed increment. A balance control loop supervisor passes information to a speed change supervisor so that a decision to increase or decrease speed can be carried out until a maximum speed is achieved.

The process begins, as illustrated at block 362. Initialization occurs, as indicated at block 364. If it is the first time within the balance control loop, as described at transition point 370, the "compute test injections" operation indicated at block 376 may occur immediately following initialization. Block 376 is fully described and represents the state transition type diagram illustrated in FIG. 10.

Figure 10:
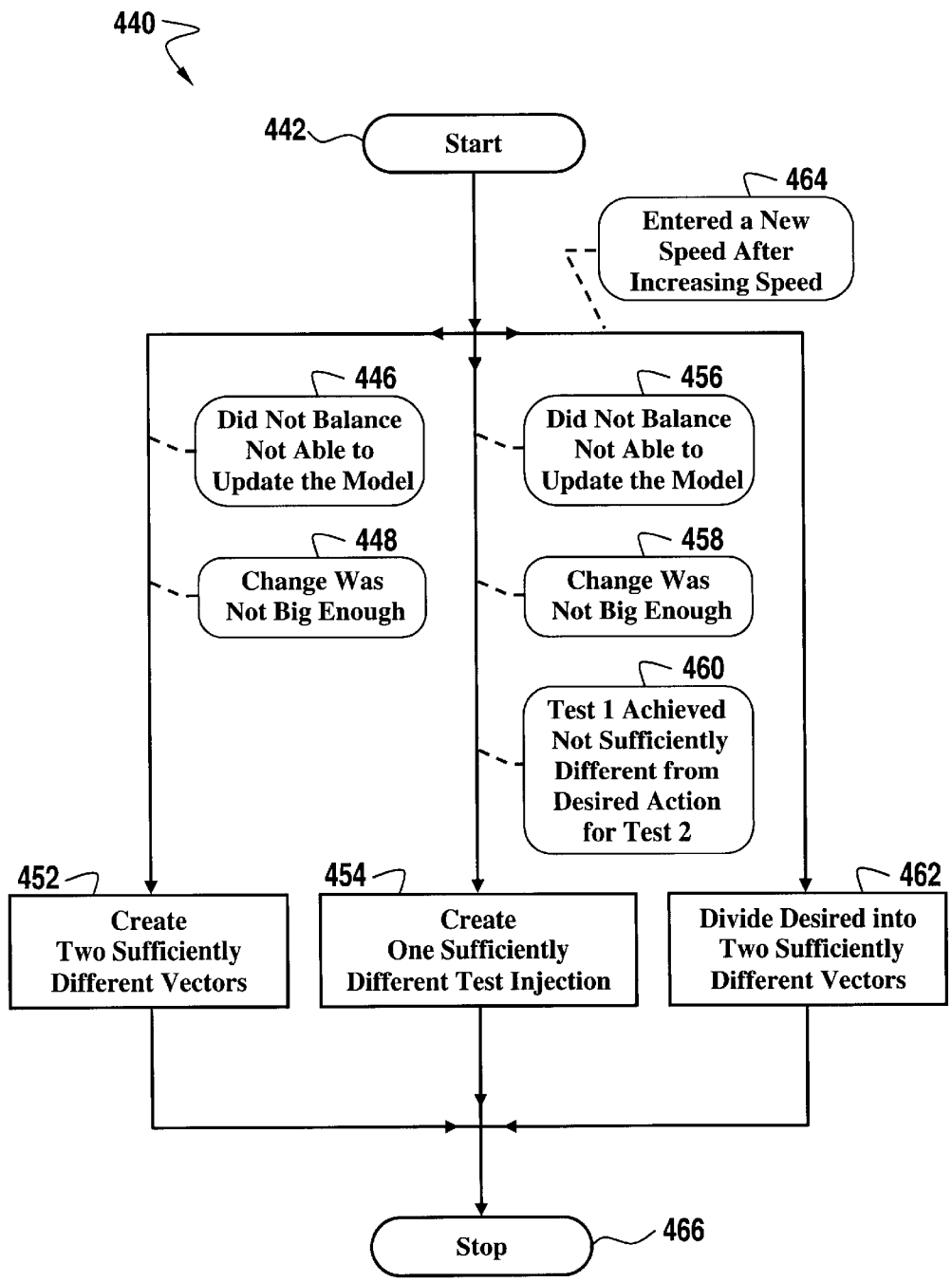
FIG. 10 depicts a state-transition-type diagram illustrating operational steps for computing test actions, in accordance with preferred embodiments of the present invention.

FIG. 10 depicts a state transition type diagram 440 illustrating operational steps for computing test actions, in accordance with preferred embodiments of the present invention. The process can be initiated, as illustrated at block 442. In the case where this block was entered under the condition described by transition point 374 of FIG. 9, two sufficiently different vectors or test actions may be created, as indicated at block 452. Two sufficiently different vectors (i.e., test actions) may be created if a balanced state has not been achieved and updates cannot be made to the control model based on prior control actions, as illustrated at transition points 446 and 448. These two test vectors can be any two actions that are predetermined to be sufficiently different.

In the case where a new speed may be entered, as illustrated at transition point 368 of FIG. 9, initialization is followed by computing the desired control action, as indicated at block 366, and test actions can then be derived from the desired control action, as illustrated at block 376. In this situation, the operation to compute test injections is entered because the system has just entered a new speed as described by the transition point 464 of FIG. 10. At the previous speed, the algorithm created a model to predict the best course of action for the next counterbalance. As discussed earlier, a speed change may cause the control model to no longer be valid, yet, it provides a good estimation at a course of control action. Thus, at each new speed a first control action is determined from the last good model, then scaled back due to the fact that it may not be an optimal solution, and then separated into two sufficiently different test actions, as illustrated at block 462 of FIG. 10 and discussed in equations 15 through 18. The test actions are intended to provide an adequate system response to update the control model.

Figure 8:
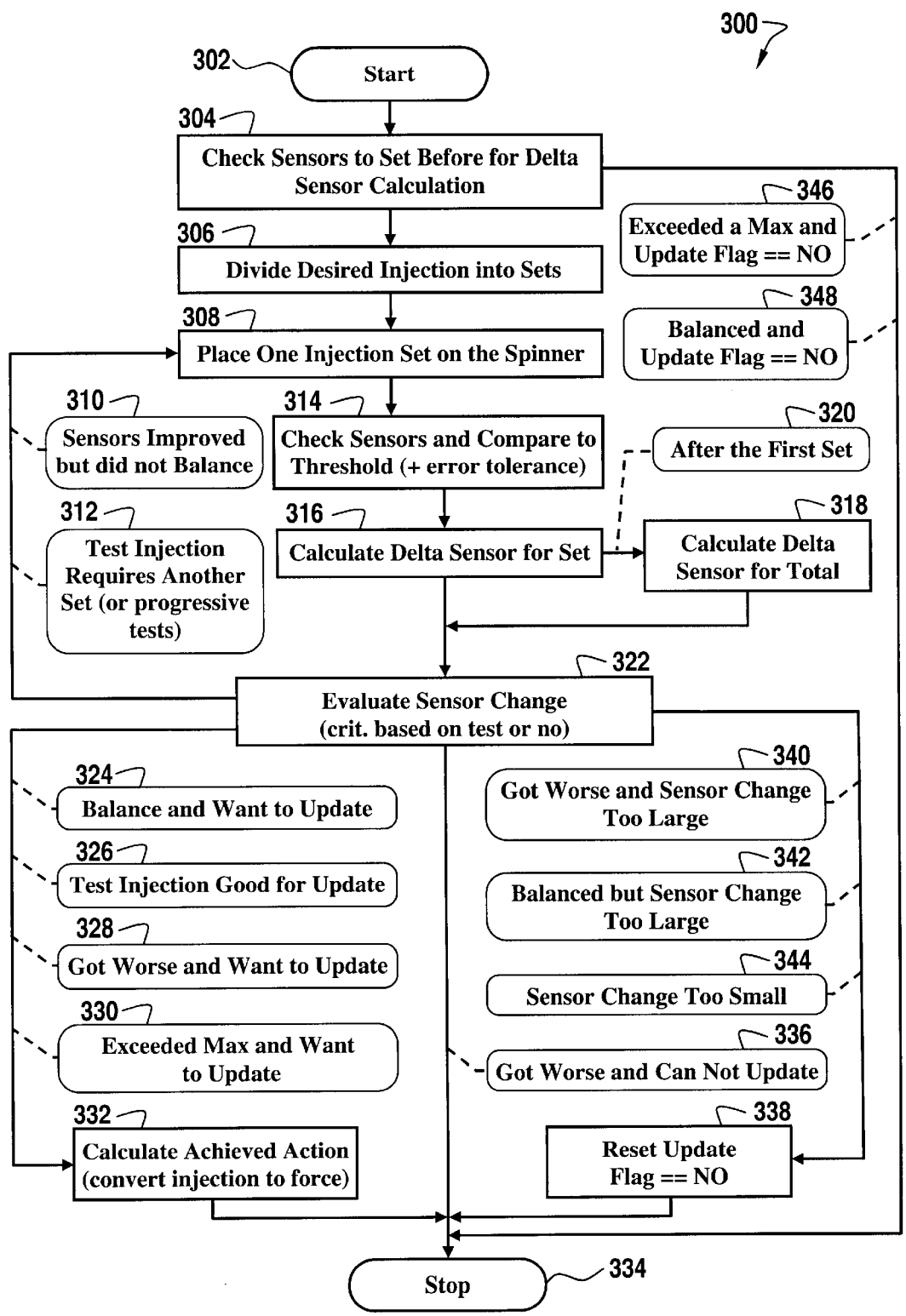
FIG. 8 depicts a state-transition-type diagram illustrating operational steps for mass placement, in accordance with preferred embodiments of the present invention.

After one or more test actions are calculated, the initial test action may then be placed on the spinner, as illustrated at block 378 of FIG. 9. Specific operational steps that can be implemented to carry out the operation described at block 378 of FIG. 9 are illustrated in FIG. 8. Thus, as illustrated at block 302, the "Place Mass on Spinner" process is initiated. As indicated next at block 304, the sensor values are recorded for use as initial values, (sensor measurement prior to any action). These values are later used to determine the change in sensor measurements due to the control action and to provide inputs to the global, distribution and rate metrics, described earlier, to assess system performance.

As depicted thereafter at block 306, a desired action is separated into one or more control sets whose aggregate represents the full control action. As illustrated next at block 308, one set is placed on the spinner. Then, as indicated at block 314, the sensors are checked again and compared to balance, maximum, and intermediate thresholds. It, as indicated at block 346, a maximum speed has been exceeded, and an update flag is equivalent to a NO value, the process simply terminates, as illustrated at block 334. Alternatively, the process may also terminate if, as illustrated at block 348, a balanced state has been achieved, but an update flag is also equivalent to a NO value.

It may be useful at this time to describe the update flag. The update flag is used to indicate whether or not a control (or test) action is suitable to update the control model. The major criterion here is that the action is sufficiently different than the last action so that the adjacent columns of the A matrix are independent with respect to the criterion of interest to the particular application. Another criterion that dictates whether or not an action is suitable to update the model is that the action is large enough to produce a suitable response in the system, i.e., a change in the sensors that is greater than the system noise. The last criterion places a lower limit on the number of sensors that have changed by more than the system noise. The second and third criteria correspond to the distribution metric and the minimum change in the sensor measurements required for that measurement to be included in the global aggregate sensor measure. The major criterion defining the status of the update flag is analyzed in block 416 of FIG. 9. This block corresponds to the logical operations depicted in the state transition type diagram of FIG. 11.

Figure 11:
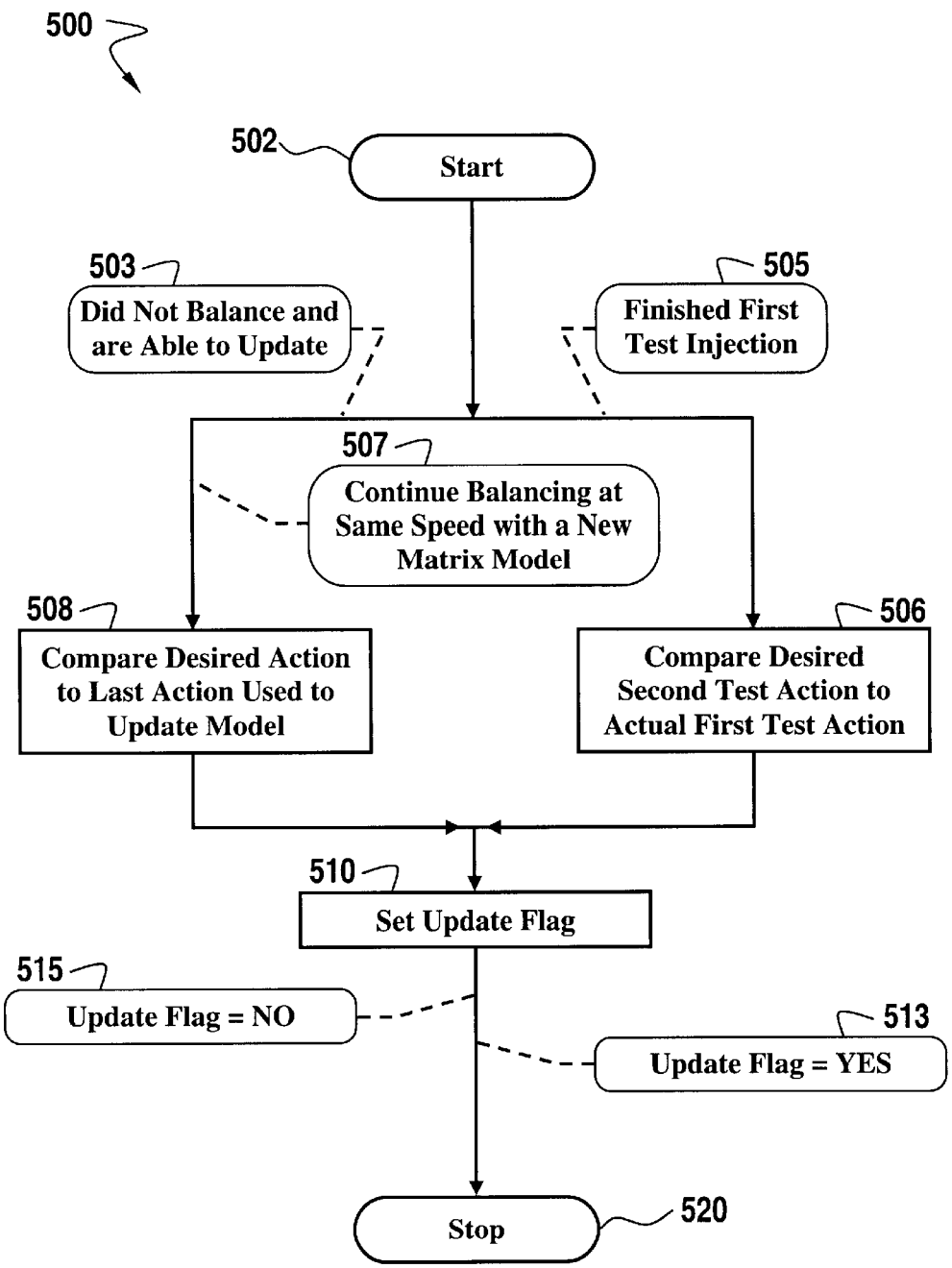
FIG. 11 illustrates a state-transition-type diagram depicting operational steps that may be implemented to determine if control actions are sufficiently different from one another, in accordance with preferred embodiments of the present invention.

FIG. 11 illustrates a state-transition-type diagram 500 illustrating operational steps that may be implemented to determine if control actions are sufficiently different from one another, in accordance with preferred embodiments of the present invention. Thus, as described at block 502, the process is initiated. Thereafter, as indicated at blocks 506 and 508, two possible operational paths may be followed. If there have been two test actions computed and the first test action is complete, as indicated at transition point 505, then the operation described at block 506 is processed, in which a desired second test action is compared to the actual first test action. In the case where the system has completed at least one recommended control action and the rotatable system or apparatus requiring balancing did not balance, but is in a condition that allows for a control model update, as described at transition point 503, then the desired control action can be compared to the last action utilized to update the control model, as indicated at block 508. Likewise, in situations where balancing continues at the same speed with a new A matrix in the control model as depicted at transition point 507, then a desired control action can be compared to the last action utilized to update the control model, as indicated at block 508. These last two cases are described by blocks 392 and 396, as well as transition point 402, of FIG. 9.

Following the operations described at both blocks 506 and 508 the update flag is set, as indicated at block 510. Here, if the actions are considered sufficiently different, the update flag is set to a "YES" state, as described at transition point 513. Conversely if the actions are NOT considered sufficiently different, the flag is set to NO, and after the operation at block 510 the update flag may be equivalent to a "NO" state, as illustrated at transition point 515. After the flag is set the function returns to the balance loop described in FIG. 9.

Continuing in the description of FIG. 8 in the cases where neither of the conditions described by transition points 346 or 348 occur, a delta sensor value can be calculated for a particular set, as described in block 316. In the case where the set being applied is not the first, as shown in transition point 320, the change over all of the sets that have made up the current action are calculated, as illustrated at block 318. Otherwise the total change is the same as the delta or set change and the process moves to block 322. In block 322 the total sensor change is evaluated using the distribution and global sensor criteria described herein.

Based on the evaluation indicated in block 322, many different conditions may arise, which conditions are described by transition points 310, 312, 324, 326, 328, 330, 336, 340, 342, and 344. For example, the operation illustrated at block 308 may be processed such that an additional control set is placed on the spinner. This scenario may occur when the test action requires another or a progressive set of actions to accomplish the test, as illustrated at block 312, or if the sensors improve but do not achieve a balanced state, so additional control sets are applied, as indicated at block 310.

In all the cases defined by transition points 324 to 330, the action is recorded and converted to a form that can be used to update the system model as indicated by block 332. Transition point 324 is reached when the rotating apparatus is in balance and the prior control or test action is considered to be "good" for the model update. Recall that the term "good" for a model update may mean that the change in the minimum number of sensors is greater than the system noise and the global change in sensors is considered to be sufficient. Transition point 326 covers the case where the action was merely a test action and this test action has met the "good" for update conditions. If the global sensor criterion indicates the system became worse or one of the individual sensor measurements exceeded its maximum threshold, but the system has still met the "good" for update criteria, the situations are described by transition points 328 and 330, respectively.

For the other transition points that can occur as a result of the evaluation described at block 322, the control model cannot be updated and the system immediately returns to the balance loop. In the conditions described by 336 and 340, the system gets worse and the action is not suitable for updating the model. In the transition point described by 344 the sensor change is too small and no determinations can be made. Finally in the case described by transition point 342 the system has reached a balanced state but the action was not suitable to update the model. For the cases described by transition points 340 to 344, the update flag is set to NO. In the case described by transition point 336, the update flag was already NO. In all cases this information is then passed back to the balance loop that continues operation at block 378 (in FIG. 9) armed with the new information from the place mass function.

After the actions described by block 378 and FIG. 8 are carried out, numerous additional conditions may arise. If the sensor measurement change is too small, the sensor measurements are worse with an insufficient change to update the control model, and the rotatable apparatus (i.e., rotating device or rotating system) did not achieve a balanced state, as respectively depicted at blocks 382, 380, and 374, then the operation illustrated at block 376 may be repeated. The logical operation illustrated at block 376 is described in greater detail via the remaining logical operations illustrated in FIG. 10. In these cases, the previous counterbalance action cannot be used to update the control model. Thus, one sufficiently different test action may be created, as indicated at block 454 of FIG. 10. If a control action is completed, a balanced state is not achieved, and the last action was inadequate to update the control model, transition point 456, or the most recent sensor measurement change due to control or test action is not large or different enough, transition points 458 and 460, then a single sufficiently different test action may be created, as illustrated at block 454. The procedure discussed in relation to equation 19 may be performed to determine an appropriate test action. This procedure describes the details of block 454.

Once a new test action has been created by one of the methods of FIG. 10, the operation described at block 378 and in FIG. 8, in which a test action is taken on the rotating apparatus, is repeated. Many of the conditions that are indicated as transition points in FIG. 9 directly correspond to transition points from FIG. 8. The conditions of transition point 406 and 408 for example correspond to 346 and 348 respectively. Transition point 408 also corresponds to transition point 342. In all of these cases the system cannot continue at the current speed so the system exits the balance control loop with the appropriate information as described at block 412 of FIG. 9. The control strategy will return to the speed control portion to decide whether a speed increase or decrease is required.

All of the transition conditions from FIG. 8 that lead to block 332 (i.e., transition points 324, 326, 328, and 330) result in an update to the control model. These transition points correspond to 384, 388, 390 and 386 of FIG. 9, respectively, and result in the action of computing a new column of the A matrix in the control model, as indicated at block 392. The conditions associated with this action are as follows. First, as illustrated at block 384, the rotatable apparatus may have achieved a balanced state and updates to the control model can be made. Second, as described at block 386, a maximum threshold has been exceeded, but updates to the control model may still be made. Third, as indicated at block 388, the sensor measurements may have improved, indicating a more balanced system, but may require a new control model to achieve a balanced state. Fourth, as described at block 390, the sensor measurements may have become worse, but have changed sufficiently to allow updates to the control model.

Following processing of the operation described at block 392, if we are in the middle of applying two test actions and have only finished the first one, as indicated in transition point 404, then a check can be performed to determine if the resulting sensor measurement response to the initial test action is sufficiently different from the desired second test action, as illustrated at block 416. Block 416 is represented in more detail in FIG. 11 as has previously been described herein. In the case where transition point 404 leads to block 416 in FIG. 9 the first test injection is complete, as indicated at transition point. 505 (FIG. 11), then the operation described at block 506 is processed, in which a desired second test action is compared to the actual first test action. This test may be generally referred to as a "difference check."

As has previously been described herein, in order to achieve a good model of a given system in which the rotatable apparatus operates, test masses may be required that are sufficiently different (i.e., orthogonal) from one another to excite the system in sufficiently different directions. Alternatively, when there is no next test action waiting to be applied, a desired control action may be computed following completion of the operation described at block 392. The desired action can be computed utilizing the calculated A matrix, as indicated at transition point 394. If, following processing of the operation illustrated at block 396, a balanced state has been achieved and the control model can be updated, as illustrated at transition point 398, or a maximum speed has been exceeded and the control model can be updated, the system exits the balance loop with the appropriate information as described at block 412 and the control strategy will return to the speed control portion to decide whether a speed increase or decrease is required.

If, following completion of the operation depicted at block 396 in which a desired action is computed, balancing continues at the same speed with a new A matrix model, as indicated at transition point 400. In addition, if a balanced state has not been achieved, but updates can be made to the control model, as illustrated at transition point 402, then the operation illustrated at block 416 may occur immediately following processing of the operation depicted at block 396. After a check has been made to determine if particular control actions are sufficiently different from one another, the operation depicted at block 378 may be repeated. Alternatively, if a first test has been achieved via control or test actions, but the subsequent control or test actions are not sufficiently different, then determination of a second test may be desired, as indicated at block 372. In this case, the operation illustrated at block 376 may be repeated, in which test actions are computed.

Those skilled in the art can appreciate that this strategy can be implemented on a batch of collected data if a serial implementation is utilized. The algorithms, however, may not require batch data or off-line processing and can be implemented on a sample-by-sample basis or in real time with a processor and data collection approach that is sufficiently fast. At least one revolution of data should generally be processed to determine the action parameters.

Those skilled in the art can further appreciate that the operational steps depicted in FIGS. 8 to 11 may be implemented as program code or as a software module or series of related software modules. Such modules may be integrated with hardware to perform particular operational functions. The term "module," as known by those skilled in the computer programming arts, generally refers to a collection of routines, subroutines, and/or data structures, which perform a particular task or implement certain abstract data types. Modules are generally composed of two features. The first feature can be implemented as an interface, which compiles the constants, data types, variables, and routines. The second feature can be configured as a private algorithm that is accessible only by the module and which includes the source code that activates the routines in the module or modules thereof. A software implementation of the present invention may thus involve the use of such modules and/or implementation of a program product based on the operational steps illustrated in FIGS. 8 to 11 herein. Such a program product may additionally be configured as signal-bearing media, including recordable and/or transmission media.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for dynamically balancing a rotating system through strategic control model updates, wherein said rotating system includes sensors and sensor measurements thereof whose responses to control actions are utilized to represent said rotating system through a control model, wherein said control model and said sensor measurements are determinative of future control actions, said method comprising the steps of:

anticipating a control model performance utilizing metrics and evaluations of said sensor measurements and said responses thereof to determine if it is necessary to update said control model;

determining if said sensor measurements and said responses thereof are adequate for use in updating said control model utilizing said metrics;

computing at least one select control action that excites said rotating system to provide a sufficiently different sensor measurement response adequate for use in updating said control model; and incorporating said metrics and evaluations and said at least one select control action into a balance control procedure to thereby improve balance times and facilitate achievement of maximum spin speeds within said rotating system.

2. The method of claim 1 wherein the step of computing a select control action, wherein said select control action excites said rotating system to provide a sufficiently different sensor measurement response adequate for use in updating said control model, further comprises the step of:

computing a select control action when control model performance is poor and past control actions are not adequate for control model updates, wherein said select control action excites said rotating system to provide a sufficiently different sensor measurement response that is adequate for use in updating said control model.

3. The method of claim 2 wherein the step of computing a select control action when control model performance is poor and past control actions are not adequate for control model updates, wherein said select control action excites said rotating system to provide a sufficiently different sensor measurement response that is adequate for use in updating said control model, further comprises the step of:

computing a select control action when control model performance is poor and past control actions are not adequate for control model updates, wherein said select control action excites said rotating system to provide a sufficiently different sensor measurement response adequate for use in updating said control model, wherein said select control action minimizes effects that do not contribute to balancing of said rotating system.

4. The method of claim 1 further comprising the step of:

calculating a plurality of select control actions when control model performance is questionable because operating conditions have changed substantially, such that said plurality of select control actions excite said rotating system to provide sufficiently different sensor measurement responses adequate for updating said control model, wherein said plurality of select control actions minimize effects that do not contribute to balancing of said rotating system.

5. The method of claim 4 wherein the step of calculating a plurality of select control actions when a control model performance is questionable because operating conditions have changed substantially, such that said plurality of select control actions excite said rotating system to provide sufficiently different sensor measurement responses adequate for updating said control model, wherein said plurality of select control actions minimize negative balancing effects on said rotating system, further comprises the steps of:

utilizing a control model from a previous operating point and current sensor measurement responses to obtain a recommended control action for a subsequent control action;

dividing said recommended control action into at least two sufficiently different control action vectors whose cumulative effect excites said rotating system sufficiently to update said control model;

manipulating said control action vector to meet system-balance, operational-safety, and physical constraints; and exciting said rotating system utilizing said control action vectors; and updating said control model utilizing resulting sensor measurement responses.

6. The method of claim 1 further comprising the step of:

utilizing said metrics, sensor measurements and sensor measurement responses thereof to determine when and how to update said control model.

7. The method of claim 1 further comprising the steps of:

configuring said metrics to include a global metric, a distribution metric and a change rate metric, wherein said distribution metric includes sensor distribution data and said change rate metric includes sensor measurement response change rate data; and utilizing said metrics to evaluate a particular balance condition and to determine whether sensor measurement responses are adequate for a control model update.

8. The method of claim 7 wherein said global metric comprises an aggregate cost function that generates a single measure representing a balance state and an additional single measure representative of an overall response of said rotating system to past control actions.

9. The method of claim 7 wherein said distribution metric comprises a single measure representing a distribution of individual sensor contributions to said global metric.

10. The method of claim 7 wherein said change rate metric comprises a change in an aggregate cost function, which generates a single measure that anticipates control model performance.

11. The method of claim 1 further comprising the step of:

assessing said control model performance of said rotating system utilizing at least one sensor integrated with said rotating system to determine if sufficient information is available to permit an update of said control model.

12. The method of claim 1 wherein the step of computing a select control action that excites said rotating system to provide a sufficiently different sensor measurement response adequate for use in updating said control model, further comprises the steps of:
- creating a control action vector sufficiently different from previous control actions utilized in prior updates of said control model;
- manipulating said control action vector to meet system-balance, operational-safety, and physical constraints;
- exciting said rotating system utilizing said control action vector; and
- updating said control model utilizing resulting sensor measurement responses.

13. The method of claim 1 wherein the step of incorporating said evaluation and said select control action into a balance control procedure to thereby improve balance times and facilitate achievement of maximum spin speeds within said rotating system, further comprises the step of:
- creating an initial control model utilizing a plurality of select control actions to generate predictions of future control actions;
- applying said generated predictions in a predetermined manner to satisfy constraints of said rotating system;
- evaluating a balance condition of said rotating system utilizing a response of said system applied to said generated predictions;
- updating said control model when an improved control model is required for convergence to obtain a balance condition at a set speed of rotation;
- formulating a new control model when changes in operational conditions occur; and
- continuing said balance control procedure until a maximum rotational speed is obtained.

14. The method of claim 13 wherein said operational conditions comprise a change of speed of said rotating system.

15. The method of claim 13 wherein said operational conditions comprise a load change within said rotating system.

16. A method for dynamically balancing a rotating system through strategic control model updates, wherein said rotating system includes sensors and sensor measurements thereof whose responses to control actions are utilized to represent said rotating system through a control model, wherein said control model and said sensor measurements are determinative of future control actions, said method comprising the steps of:
- anticipating a control model's performance utilizing metrics and evaluations of said sensor measurements and said responses thereof to determine if it is necessary to update said control model;
- determining if said sensor measurements and said responses thereof are adequate for use in updating said control model utilizing said metrics;
- computing at least one select control action that excites said rotating system to provide a sufficiently different sensor measurement response adequate for use in updating said control model;
- configuring said metrics to include a global metric, a distribution metric and a change rate metric, wherein said distribution metric includes distribution sensor data and said change rate metric includes sensor measurement response change rate data;
- utilizing said metrics to evaluate a particular balance condition and whether sensor measurement responses are adequate for a control model update; and
- incorporating said metrics and evaluations and said at least one select control action into a balance control procedure to thereby improve balance times and facilitate achievement of maximum spin speeds within said rotating system.

* * * * *